United States Patent [19]

Kitagawa et al.

[11] Patent Number: 4,835,209

[45] Date of Patent: May 30, 1989

[54] RUBBER FOR TIRE TREADS AND COMPOSITIONS THEREOF

[75] Inventors: Yuichi Kitagawa; Haruo Yamada, both of Yokohama; Akira Saito, Fujisawa, all of Japan

[73] Assignee: Asahi Kasei Kogyo Kabushiki Kaisha, Osaka, Japan

[21] Appl. No.: 30,860

[22] PCT Filed: Jan. 9, 1987

[86] PCT No.: PCT/JP87/00013

§ 371 Date: Mar. 16, 1987

§ 102(e) Date: Mar. 16, 1987

[87] PCT Pub. No.: WO87/04172

PCT Pub. Date: Jul. 16, 1987

[30] Foreign Application Priority Data

Jan. 10, 1986 [JP] Japan .................................. 61-2279
Jun. 24, 1986 [JP] Japan .............................. 61-146116
Aug. 25, 1986 [JP] Japan .............................. 61-197346

[51] Int. Cl.$^4$ ............................................. C08F 8/30
[52] U.S. Cl. ................................... 524/507; 524/512; 524/542; 524/572; 524/575; 525/107; 525/113; 525/123; 525/153; 525/154; 525/332.6; 525/332.7; 525/332.9; 525/332.2; 525/344; 525/348; 525/349; 525/351; 525/374
[58] Field of Search .............. 525/374, 107, 113, 123, 525/153, 154, 332.6, 332.7, 332.9, 333.2, 344, 348, 349, 351; 524/507, 512, 542, 572, 575

[56] References Cited

U.S. PATENT DOCUMENTS

| | | | |
|---|---|---|---|
| 3,226,356 | 12/1965 | Kehr et al. | 525/374 |
| 3,528,958 | 9/1970 | Achorn | 525/374 |
| 3,968,092 | 7/1976 | Gruber | 525/374 |
| 4,547,560 | 10/1985 | Hattori et al. | 526/340 |
| 4,555,547 | 11/1985 | Ueda et al. | 525/237 |

FOREIGN PATENT DOCUMENTS 0150479 8/1985 European Pat. Off.
58-53035 11/1983 Japan .

OTHER PUBLICATIONS

Database Chemical Abstracts, (1983), Abstract No. 110(20):158063r, p. 79.

*Primary Examiner*—Joseph L. Schofer
*Assistant Examiner*—Bernard Lipman
*Attorney, Agent, or Firm*—Birch, Stewart, Kolasch & Birch

[57] ABSTRACT

The present invention relates to a rubber-like polybutadiene or a rubber-like butadiene-styrene copolymer suited for use in tire treads which are obtained by polymerization of the monomer(s) in the presence of an organolithium catalyst, followed by reacting a carbodiimide with the reactant product thereof so as to subject it to reaction at its living point, and if necessary, further reacting the product thus obtained with a trifunctional or higher-order coupling agent. The invention further relates to a process for the production thereof, and a rubber composition containing more than a definite amount of said polymer.

17 Claims, No Drawings

RUBBER FOR TIRE TREADS AND COMPOSITIONS THEREOF

DESCRIPTION

1. Field of the Invention

The present invention relates to a rubber-like polybutadiene or a styrene-butadiene copolymer produced by the use of an organolithium catalyst which is suitable for treads of fuel-cost-saving tires and all-season tires, a process for the production thereof, and a composition containing the above compound.

2. Background of the Invention

In recent years, automobile tires have been desired to be reduced in rolling resistance from the viewpoint of saving fuel cost and to be improved in control stability and wet skid properties (breaking capabilities on wet roads) from the viewpoint of the safety of automobiles. On the other hand, the production of tires for the automobile has been desired to be improved in the uniformity of quality by improving the processability and in the productivity by improving the workability.

As methods for reducing the rolling resistance while maintaining the wet skid properties of tire, methods such as weight reduction of the the tire, optimization of the structure of tire, improvement of the tread pattern of tire, improvement of a rubber composition used in tire-tread, etc. have been heretofore attempted. Among them, the method for reducing the rolling resistance by improving a rubber composition used in the tire tread includes a method using as starting rubber a rubber having a small hysteresis loss, a method using carbon black having a larger particle size in place of carbon black having a smaller particle size, a method comprising reducing the amount of carbon black and oil used in vulcanized rubber, etc.

As the method comprising improving the starting rubber among the above-mentioned improvement methods, the employment of a polymer having a higher molecular weight was proposed on the basis of conventional information concerning the physical properties of starting rubbers and vulcanized rubbers. However, according to this method, the impact resilience can be improved but the Mooney viscosities of a starting material and compounding ingredients are increased, resulting in the lowering of the processability, so that no great improvement can be made. On the other hand, according to the method comprising changing the formulation so as to reduce the mixing amounts of oil and carbon black, the Mooney viscosities of compounding ingredients are increased, resulting in a lowering of the processability. Thus, whichever method is employed, it is difficult to affect the improvement without sacrificing the processability.

In recent years, it has been found that random styrene-butadiene copolymer rubber having many vinyl linkages and a branched structure have been suitably used in tires, and rubbers various in structure have been investigated and various proposals have been made. For example, there has been proposed a method in which in coupling a styrene-butadiene copolymer rubber having an increased vinyl content by use of tin to form a branched styrene-butadiene copolymer rubber, the rolling resistance is improved by adding the butadiene immediately before the coupling reaction to carry out polymerization (Japanese Patent Application Kokai (Laid-Open) Nos. 87407/82 and 162605/83). However, even this method can make insufficient improvement in the rolling resistance and has been disadvantageous, for example, in that the production process becomes troublesome.

There has also been proposed a completely random styrene-butadiene copolymer rubber produced by introducing monomers continuously into a polymerization region having a high stirring efficiency controlled so as to be a temperature of 80° C. or higher to allow polymerization to proceed by use of a catalyst composed of an organolithium compound and a Lewis base (U.S. Pat. No. 4,547,560). This polymer showed excellent performance characteristics with respect to tensile strength, impact resilience, low heat-generating properties, wear resistance, wet skid properties, etc. However, it required a further improvement in impact resilience, low heat-generating properties, etc.

In addition thereto, as methods for improving the starting rubber, there have been proposed various methods which comprise introducing a functional group into the end of a living polymer. For example, there is a method which comprises producing a living polymer by the use of a bifunctional anionic initiator, and then acting thereon an organosulfenyl chloride to introduce an active group to each end of the molecule (Japanese Patent Publication No. 855/69). However, this method is disadvantageous for industrial application, for example, because it is difficult to obtain a polymer with a high molecular weight both ends of which are living by this method and organosulfenyl chloride is difficult to handle. Moreover, polymer obtained by this method was insufficient in tensile strength, modulus, etc. Further, there is a method which comprises introducing an amino group into the end (Japanese Patent Application Kokai (Laid-Open) No. 38209/84, DE-3309821 and EP-150479), but this method is disadvantageous in that the Mooney viscosities of the compounding ingredients are greatly increased to impair the processability. Moreover, the improvement of the impact resilience, low heat-generating properties, wear resistance, wet skid properties, etc. by this method were insufficient.

Furthermore, with a recent increase in the demand for all-season tires from the industrial world, rubber compositions for tire treads have come to be required to have higher performance characteristics balance than ever. For example, rubbers used in tire treads have come to be required to have control capability on snowy or icy roads in cold districts in winter in addition to the conventional rolling resistance capability and wet skid properties, and are required to be improved in wear resistance.

As to such functions required of all-season tires, in order to improve the low-temperature performance, there has been attempted the blending of a natural rubber type, the employment of an oil or plasticizer having a more satisfactory low-temperature performance, and the employment of a filter other than carbon black, etc. However, when such various compounding ingredients are used, there is a problem in the lowering of the mechanical strength and the like due to the compounding ingredients. Therefore, the rubber used cannot but be limited in kind to those which are only slightly lowered in mechanical strength, so that the freedom of formulation is not always high.

SUMMARY OF THE INVENTION

Accordingly, the present inventors have devoted themselves to research in order to develop a synthetic rubber and a composition thereof which have very excellent performance characteristics with respect to tensile strength, impact resilience, low heat-generating properties and wear resistance without impairing the wet skid properties, processability, etc., and have found that specific polybutadienes or styrene-butadiene copolymers and compositions thereof have such performance characteristics, whereby this invention has been accomplished.

DETAILED DESCRIPTION OF THE INVENTION

Accordingly, one aspect of this invention relates to a polymer having a Mooney viscosity of 20 to 150 obtained by carrying out modification at the end of a polymer by reacting a carbodiimide with a living polymer which is a rubber-like polybutadiene, or a rubber-like butadiene-styrene copolymer having an amount of styrene of 45% by weight or less obtained by polymerization of the corresponding monomer(s) in a hydrocarbon solvent by use of an organolithium catalyst, and has a vinyl linkage content of butadiene portion of 10 to 70% and a molecular weight distribution of ($\overline{Mw}/\overline{Mn}$) expressed in terms of the ratio of the weight average molecular weight ($\overline{Mw}$) to the number average molecular weight ($\overline{Mn}$) as measured by GPC of 1.2 to 3; and a process for producing said polymer.

As the organolithium catalyst used in this invention, any one may be used so long as it is a hydrocarbon having at least one lithium atom bonded thereto, and the catalyst includes, for example, ethyl lithium, propyl lithium, n-butyl lithium, sec-butyl lithium, tert-butyl lithium, phenyl lithium, propenyl lithium, hexyl lithium, etc., and n-butyl lithium and sec-butyl lithium are particularly preferred. These organolithium catalysts may be used either alone or as a mixture thereof. The amount of the organolithium catalyst used is usually 0.3 to 3 mmoles, preferably 0.5 to 1.5 mmoles per 100 g of monomer, though the amount depends on the Mooney viscosity of a polymer to be produced.

The hydrocarbon solvent used in this invention includes n-butane, n-pentane, iso-pentane, n-hexane, n-heptane, iso-octane, cyclohexane, methylcyclopentane, benzene, toluene, etc., and particularly preferable solvents are n-hexane, n-heptane and cyclohexane. These hydrocarbon solvents may be used alone or as a mixture thereof and are used usually in a proportion of 1 to 20 parts by weight per one part of monomer.

The bound styrene content of the styrene-butadiene copolymer rubber of this invention is preferably 45% by weight or less. When it exceeds 45% by weight, heat generation is increased and the impact resilience is lowered, resulting in deterioration of the performance characteristics. The bound styrene content is preferably 30% by weight or less. On the other hand, when the bound styrene content is too low, the tensile strength is lowered. Therefore, it is preferably 5% by weight or more. Further, its particularly preferable range is 10 to 30% by weight from the viewpoint of the balance among wet skid, tensile strength, impact resilience and heat generating properties.

The vinyl linkage content of butadiene portion of the polybutadiene or styrene-butadiene copolymer rubber of this invention ranges from 10 to 70%, preferably from 15 to 50%. When the vinyl linkage content is too low, the wet skid resistance is low, while the vinyl linkage content is too high, the wear resistance is lowered. The vinyl linkage content is particularly preferably in the range of 20 to 45%.

The molecular weight distribution of the styrene-butadiene copolymer rubber of this invention is 1.2 to 3, preferably 1.5 to 2.5. This molecular weight distribution refers to the ratio of the weight average molecular weight ($\overline{Mw}$) to the number average molecular weight ($\overline{Mn}$) as determined from a calibration curve of standard polystyrenes by using gel permeation chromatography (GPC). When the molecular weight distribution is small, the processability is insufficient, while when the molecular weight distribution is large, the impact resilience and the low heat-generating properties are insufficient. The molecular weight distribution measured by GPC may be either of one-peak type or two-peak type. There may be employed a method for enlarging the molecular weight distribution or increasing the branches by using coupling agents such as silicon tetrachloride, alkylsilicon trichlorides, dialkylsilicon dichlorides, and tin tetrachloride, or branching agents such as divinylbenzene, which usually employed for improving processability, etc.

The styrene-butadiene copolymer rubber of this invention is preferably a random copolymer. The styrene chain distribution of the styrene-butadiene copolymer rubber is analyzed by GPC of low-temperature ozone degradation product of the copolymer rubber. This method was developed by Tanaka et al., and in this method, the styrene chain distribution is analyzed by GPC of a degradation product obtained by subjecting all the double bonds of butadiene to ozone cleavage (Macromolecules, 1983, 16, 1925). In the copolymer of this invention, the amount of isolated styrene, i.e., styrene constituting chains of one styrene unit is preferably 40% by weight or more, more preferably 50% by weight or more based on the total bound styrene, as analyzed by the above method, and the amount of long-chain block styrene, i.e., styrene constituting chains of 8 or more styrene units is preferably 5% by weight or less, more preferably 2.5% by weight or less based on the total bound styrene. When the amount of isolation styrene is less than 40% by weight, or when the amount of long-chain block styrene exceeds 5% by weight, there is caused a lowering of the balance between high wet skid resistance and the two properties, i.e., high impact resilience and low heat-generating properties which is an excellent characteristic of this invention. Therefore, neither of such proportions are desirable.

The carbodiimide used in this invention may be any disubstituted carbodiimide compound having a linkage of the general formula —N=C=N— or any disubstituted cyanamide compound having a linkage of the general formula >N—C≡N, and includes, for example, compounds belonging to dialkylcarbodiimides, alkylarylcarbodiimides, diarylcarbodiimides, dialkylcyanamides, alkylarylcyanamides and diarylcyanamides. These compounds are used alone or as a mixture thereof.

Specifically, there are exemplified dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, phenylbenzylcarbodiimide, dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenylcyanamide, phenylbenzylcyanamide, etc. Among them, dicyclohexylcarbodiimide, diphenylcarbodiimide and diphenylcyanamide are particularly suitable.

These compounds are fed in a proportion of 0.2 to 5 moles, more preferably 0.3 to 3 moles per mole of the living polymer. A still more preferable feeding amount is a proportion of 0.5 to 2 moles. When the feeding amount is too small, only a small improving effect on the physical properties can be obtained, while when the feeding amount is too large, unreacted substances exert influences such as a reduction of the vulcanization time and a lowering of the tensile strength. Therefore, neither of such feeding amounts are desirable. The reaction of the living polymer with the above compounds is very rapid, and the reaction temperature is generally from room temperature to 120° C. and the reaction time is from several seconds to several hours.

A more preferable polymer can be obtained when the living polymer molecules are combined to form a branched polymer by using a trifunctional or higher-order coupling agent in an amount of 0.1 to 0.7 equivalent, preferably 0.1 to 0.5 equivalent per mole of the living active site, and a carbodiimide is introduced into all or the residual living active sites. In this case, cold flow of rubber-like polymer is prevented and there is obtained a rubber-like polymer which is excellent in processability, very excellent in performance characteristics of vulcanized product, and well-balanced. When the amount of functional groups of trifunctional or higher-order coupling agent used is less than 0.1 equivalent per equivalent of the living active site, the preventing effect on cold flow is small, resulting in a lowering of the processability, while it exceeds 0.7 equivalent, the amount of the carbodiimide introduced is decreased, so that the performance characteristics of vulcanized product are deteriorated.

Thus, there is obtained one preferable embodiment of the polymer of this invention, namely, a polybutadiene or a styrene-butadiene copolymer comprising a branched polymer molecule and a straight-chain polymer molecule wherein (1) 10 to 50% by weight of the molecules constituting the polymer is a branched polymer formed by binding by means of a trifunctional or higher-order coupling agent, and (2) at least 20% by weight, more preferably 30% by weight of the molecules constituting the polymer is a straight-chain polymer having a carbodiimide added thereto.

From the viewpoint of the balance between the processability and the two properties, i.e., the impact resilience and low heat-generating properties, it is particularly preferable that the amount of the branched chain polymer molecule ranges from 10 to 40% by weight. When the amount of the straight-chain polymer having the carbodiimide bonded thereto is less than 20% by weight, the improving effects on the impact resilience and the low heat-generating properties are small.

Furthermore, from the viewpoint of improving the impact resilience and the low heat-generating properties, it is particularly preferable that the total amount of the branched polymer molecule and the straight-chain polymer molecule having the carbodiimide bonded thereto is 50% by weight or more of the molecules constituting the polymer.

Since the reaction of the living polymer with the coupling agent as a branching agent and the carbodiimide is substantially quantitative, the above-mentioned amounts of the branched polymer molecule and straight-chain polymer molecule can be attained by controlling the equivalent ratio between activated lithium and these reactive compounds.

The amount of each component in the aforesaid polymer can be measured by separation of each component by GPC, determination of the amount of terminal group of the polymer by use of a reagent reactive to the active terminal group of the polymer, or comparison between the analysis results of GPC before and after the reaction with the carbodiimide.

The trifunctional or higher-order coupling agent includes polyhalogenated compounds such as trichloromethylsilane, tetrachlorosilane, hexachlorodisilane, tin tetrachloride, butyltin trichloride, tin tetraiodide, carbon tetrachloride, etc.; diesters such as diethyl adipate, diphenyl carbonate, etc.; compounds having two or more diglycidylamino groups in the molecule such as tetraglycidyl-1,3-bisaminomethylcyclohexane, etc.; polyepoxy compounds such as epoxidized liquid polybutadiene, etc.; and the compounds described in Japanese Patent Publication No. 36957/74, such as polyisocyanates, polyimines, polyaldehydes, polyketones, polyanhydrides, etc. Polyhalogenated tins such as tin tetrachloride and the like are particularly preferred.

The polymerization reaction, the addition reaction with a carbodiimide and the coupling reaction may be carried out either in a batchwise manner or continuously and are not particularly limited to either of these methods.

The polymer having an end-modifying group introduced thereinto by reacting the living polymer with these compounds is usually incorporated with an antioxidant and if necessary, subjected to oil extension. Subsequently, the solvent is removed by a conventional method to obtain a polymer.

The Mooney viscosity ML (1+4, 100° C.) of the polybutadiene or styrene-butadiene copolymer having an end-modifying group introduced thereinto by reacting a carbodiimide of this invention is 20 to 150, preferably 25 to 130. When the Mooney viscosity is below that range, the tensile strength, wear resistance, impact resilience and low heat-generating properties of vulcanized rubber are insufficient, and an excessive torque is placed on at the time of kneading by means of a roll or a Banbury mixer, or the dispersion of carbon become insufficient, resulting in deterioration of the performance characteristics of vulcanized rubber.

Another preferable embodiment of this invention includes a method for preventing the increase of the Mooney viscosity of a rubber-like polymer which comprises adding an amino compound in a definite proportion to a rubber-like polybutadiene or styrene-butadiene copolymer modified with a carbodiimide after or without treatment with the above-mentioned coupling agents; and a rubber-like polymer composition free from the increase of Mooney viscosity obtained by said method.

When the rubber-like polybutadiene or styrene-butadiene copolymer modified with a carbodiimide of this invention (including those having undergone reaction with the above-mentioned coupling agent) is allowed to stand for a long period of time, its Mooney viscosity is markedly increased. Moreover, the Mooney viscosity of a compound obtained by adding compounding ingredients to the above polymer is markedly increased, resulting in difficult processing, and moreover, the important performance characteristics such as impact resilience at high temperatures of vulcanized rubber are deteriorated. For keeping good processability and maintaining various performance characteristics, it is preferable to add to the rubber-like polybutadiene or styrene-butadiene copolymer of this invention an amino compound in an amount of 0.1 to 40 moles in terms of amino group per mole of the terminal functional group of the polymer. It has been proved that this addition improves not only the above-mentioned problems but also the wear resistance.

The amino compound used in this invention includes organic amino compounds of the general formula $R_n$—$NH_m$ (wherein R is an alkyl, cycloalkyl, alkylcycloalkyl, aryl, alkylaryl or arylalkyl group having 1 to 20 carbon atoms; n is an integer of 1 to 3; and m is 0, 1 or 2 and satisfies n+m=2); polyvalent amine or polyamine compounds of the general formula

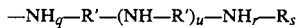

(wherein R is an alkyl, cycloalkyl, alkylcycloalkyl, aryl, alkylaryl or arylalkyl group having 1 to 20 carbon atoms; R' is an alkylene, cycloalkylene, alkylcycloalkylene, cycloalkylalkylene, arylene, alkylarylene, arylalkylene or arylcycloalkylene group having 2 to 20 carbon atoms; p is 0, 1 or 2; q is 0, 1 or 2 and satisfies p+q=2; r is 0, 1 or 2; s is 0, 1 or 2 and satisfies r+s=2; and u is zero or an integer of 1 to 9); imine compounds, for example, of the general formulas:

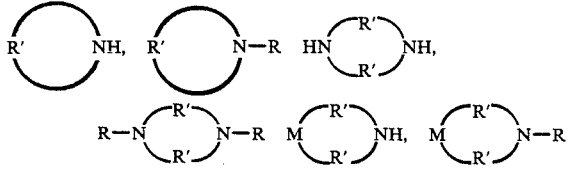

(wherein R is an alkyl, cycloalkyl, alkylcycloalkyl, aryl, alkylaryl or arylalkyl group having 1 to 20 carbon atoms; R' is an alkylene, cycloalkylene, alkylcycloalkylene, cycloalkylalkylene, arylalkylene or arylcycloalkylene group having 2 to 20 carbon atoms; and M is an O atom or an S atom); nitrogen-containing heterocyclic compounds, etc.

Specific examples of the amino compound include ethylamine, propylamine, butylamine, hexylamine, decylamine, octadecylamine, cyclohexylamine, aniline, naphthylamine, toluidine, benzylamine, diethylamine, dibutylamine, dihexylamine, didecylamine, ethylhexylamine, methylpentylamine, dicyclohexylamine, ethylcyclohexylamine, diphenylamine, methylaniline, phenylnaphthylamine, butylbenzylamine, N-methyltoluidine, triethylamine, tributylamine, trihexylamine, tridecylamine, methylethylbutylamine, dimethyloctadecylamine, dimethylcyclohexylamine, N,N-dimethylaniline, methylethylbenzylamine, N,N-dimethyltoluidine, ethylenediamine, propylenediamine, tetramethylenediamine, hexamethylenediamine, 1,12-diaminododecane, 1,4-diaminocyclohexane, m-phenylenediamine, p-phenylenediamine, 3,6-dimethyl-1,4-diaminobenzene, p-aminomethylbenzylamine, N-butylethylenediamine, N-methylpropylenediamine, N-methyl-p-phenylenediamine, N,N'-diethylethylenediamine, N-methyl-N'-butylethylenediamine, N,N'-dimethylhexamethylenediamine, N,N'-dimethyl-p-phenylenediamine, N,N'-dioctyl-p-phenylenediamine, N-ethyl-N'-cyclohexyl-p-phenylenediamine, N-propyl-N'-phenyl-p-phenylenediamine, N,N-diethylethylenediamine, N,N-dibutylethylenediamine, N,N-dimethylhexamethylenediamine, N,N-dimethyl-p-phenylenediamine, 4-N,N-dimethylaminomethylbenzylamine, ethylenediamine, N,N,N'-tributylhexamethylenediamine, N,N,N',N'-tetrabutylethylenediamine, N,N,N',N'-tetramethylhexamethylenediamine, diethylenetriamine, triethylenetetramine, tetraethylenepentamine, pentaethylenehexamine, bis(3-aminoethyl)amine, 1,3-bis(3'-aminopropylamino)propane, ethyleneimine, trimethyleneimine, 2-ethylethyleneimine, cyclohexeneimine, pyrrolidine, piperidine, nonamethyleneimine, piperazine, cyclodi(trimethylene)diimine, N-methylethyleneimine, morpholine, thiomorpholine, pyridine, pyrrole, pyrimidine, triazine, indole, quinoline, purine, etc.

Among them, compounds having a primary or secondary amino group are preferred. Further, among these compounds, there are particularly suitably used, for example, polyvalent amine or polyamine compounds such as tetraethylenepentamine, diethylenetriamine, N,N'-dibutylethylenediamine, N,N'-dioctyl-p-phenylenediamine, etc.; imine compounds such as morpholine, thiomorpholine, etc.; and aromatic amine compounds such as toluidine, N-methylaniline, etc.

In this invention, as a method for adding the amino compound, there can be employed any of a method comprising batchwise or continuous addition to a solution of a functional group-containing rubber-like polymer obtained by reacting a living polymer with a carbodiimide, a method comprising addition by mechanical kneading after removing the solvent from a solution of said functional group-containing rubber-like polymer by a conventional finishing method, etc. In particular, a method comprising reacting a living rubber-like polymer with a carbodiimide in a solution, successively adding the amino compound to the reaction solution, further adding thereto an antioxidant such as BHT, and then removing the solvent, is preferred. In this case, the preventing effect on the increase of Mooney viscosity of the resulting rubber-like polymer composition is particularly remarkable as compared with other methods. In the case of other methods comprising addition after the reaction, an increase of the Mooney viscosity is observed during the removal of solvent in some cases.

In this invention, the adding amount of the organic amino compound is 0.1 to 40 moles, preferably 0.5 to 20 moles, more preferably 1.0 to 15 moles in terms of the amino group per mole of the functional group added to the rubber-like polymer. When it is less than 0.1 mole, no preventing effect on the increase of Mooney viscosity of the rubber-like polymer composition is obtained, while when it excess 40 moles, influences, for example, bleeding of the amino compound, and an increase of the vulcanization rate during vulcanization after addition of compounding ingredients are produced, so that trouble is caused.

The polybutadiene or styrene-polybutadiene rubber modified with a carbodiimide or the rubber-like polymer formed by adding thereto an amino compound of this invention thus obtained is used as starting rubber, alone or in the form of a blend with other synthetic rubbers and/or natural rubber. In this case, for the exhibition of the excellent characteristics attained by this invention, it is necessary that at least 10% by weight of the starting rubber should be the polybutadiene or styrene-polybutadiene copolymer rubber modified with a carbodiimide of this invention, and this proportion is suitably 30% by weight or more. Particularly when the polymer having an amino compound added thereto is used, it is preferably used in a proportion of 30% by weight or more.

The synthetic rubbers or natural rubber other than the polymers of this invention which are used in the form of a blend with said polymers includes styrene-butadiene copolymer rubbers obtained by emulsion polymerization, styrene-butadiene copolymer rubbers obtained by solution polymerization having a 1,2-vinyl content of less than 35%, cis 1,4-polybutadiene rubbers, 1,2 syndiopolybutadiene rubbers, polybutadiene rubbers having a 1,2 vinyl content of 10% to 90%, synthetic polyisoprene rubbers, or natural rubber. One or more of them may be used.

The synthetic polyisprene rubbers have a cis-1,4-likage content of 90% or more. The natural rubber component is a rubber component necessary not only for improving the processability of the rubber composition of this invention but also for imparting sufficient mechanical strength and low heat-generating properties and good low-temperature performance to the rubber composition in combination with the above-mentioned specific polybutadiene or styrene-butadiene copolymer.

The precessability, impact resilience, low heat-generating properties, mechanical strength, wear resistance, and low-temperature performance can be highly balanced with one another by using the polybutadiene and/or the styrene-butadiene copolymer of this invention as 30 to 90 parts by weight, preferably 40 to 80 parts by weight of the starting rubber component, and natural rubber or the synthetic polyisoprene rubber as 10 to 70 parts by weight, preferably 20 to 60 parts by weight of the starting rubber component.

Furthermore, conjugated-diene-type rubber-like polymers other than the polymers according to this invention can be used as the starting rubber component in such a range that they do not deteriorate the performance characteristics of the above-mentioned rubber composition. Their amount is 0 to 30 parts by weight of the starting rubber component.

In addition, as a more preferable rubber-like polymer composition, there is exemplified a composition using, as the above-mentioned polybutadiene or styrene-butadiene copolymer, a polymer comprising a branched polymer molecule and a straight-chain polymer molecule in which (1) said branched polymer molecule is obtained by reacting a trifunctional or higher-order coupling agent with a living polymer and accounts for at least 10 to 50% by weight of said polybutadiene or styrene-butadiene polymer, (2) said straight-chain polymer molecule is obtained by adding a carbodiimide to all the residual living active sites simultaneously with or after the reaction with the coupling agent and accounts for at least 20% by weight of said polybutadiene or styrene-butadiene copolymer, and (3) the styrene content of said polybutadiene or styrene-butadiene copolymer is 0 to 30% by weight.

As a particularly preferable rubber-like polymer composition, there is exemplified one which is obtained by further mixing 0 to 30 parts by weight of a conjugated-diene-type rubber polymer other than the polymers of this invention with the above-mentioned rubber-like polymer composition.

The rubber-like polymers of this invention can be made into oil-extended rubber, depending on the Mooney viscosity of the rubber component. In this case, as a processing oil, aromatic oil, naphthene oil, paraffin oil, etc. can be used depending on purposes and are usually used in an amount of 5 to 50 parts by weight per 100 parts of the rubber component, and the Mooney viscosity ($ML_{1+4}$, 100° C.) of the resulting rubber-like polymer composition is preferably in the range of 20 to 80. When the Mooney viscosity is less than 20, cold flow tends to occur, while when it exceeds 80, torque is placed on at the time of compounding, resulting in difficult processing.

The rubber-like polymer composition incorporated with an amino compound of this invention also can be made into oil-extended rubber, depending on the Mooney viscosity of the rubber component. A processing oil used in this case is one which a total acid value [mg KOH/g] of preferably 0.4 or less, particularly preferably 0.1 or less. When a processing oil having a high total acid value is used, the Mooney viscosity of the rubber-like polymer composition of this invention cannot be sufficiently prevented from increasing.

A rubber-like composition which is a further aspect of this invention is obtained usually by adding reinforcing carbon black, extender oil for rubber, aliphatic carboxylic acids, sulfur, and vulcanization accelerators to a starting rubber comprising the above-mentioned rubber-like polybutadiene (including those treated with coupling agents) or styrene-butadiene copolymer (including those treated with coupling agents) which have been modified at the respective ends with a carbodiimide. In addition, if necessary, this composition may be incorporated with compounding ingredients for rubber such as vulcanization acceleration assistants, aging resistors, antiozonants, processing aids, etc.

The amount of carbon black in this composition is 10 to 100 parts by weight per 100 parts of the starting rubber. When it is less than 10 parts by weight, the tensile strength and the wear resistance are not sufficient, while when it exceeds 100 parts by weight, the rubber elasticity is greatly lowered. Therefore, neither of such amounts are desirable. Said amount is preferably 20 to 80 parts by weight.

As the carbon black used in the rubber composition of this invention, there are preferably exemplified those having an iodine adsorption amount (IA) of 40 mg/g or more and a dibutyl phthalate oil absorption (DBP) of 70 ml/100 g or more. Such carbon blacks have a uniform and small particle size and are highly structured, and when a carbon black other than them is used, there cannot, in some cases, be obtained a high balance among high tensile strength, high impact resilience and wear resistance which is required of the rubber composition of this invention. Suitable carbon blacks are those having IA of 60 mg/g to 160 mg/g and DBP of 80 ml/100 g to 150 ml/100 g.

These carbon blacks include, for example, those called HAF, ISAF and SAF.

In the rubber composition of this invention, sulfur is used as a vulcanizing agent in an amount of 0.1 to 5 parts by weight per 100 parts by weight of the starting rubber. When the amount of sulfur is too small, the tensile strength, impact resilience and wear resistance are insufficient, while it is too large, the rubber elasticity is lowered. It is preferably 0.5 to 2.5 parts by weight.

In the rubber composition of this invention, as the vulcanization accelerator, there are used conventional various vulcanization accelerators, namely, those of sulfenamide series, guanidine series, thiuram series, etc., and the using amount is preferably 0.2 to 3 parts by weight per 100 parts by weight of the starting rubber. Particularly preferably, vulcanization accelerators of thiazole series are used. The vulcanization accelerators of thiazole series are vulcanization accelerators having, as its basic structure, a

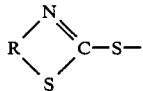

(wherein R is alkylene or arylene) group. When these vulcanization accelerators are used, there can be obtained particularly the composition having excellent tensile strength, impact resilience and wear resistance of this invention.

These accelerators include suitably vulcanization accelerator M (2-mercaptobenzothiazole), vulcanization accelerator DM (dibenzothiazyl disulfide) and vulcanization accelerator CZ (N-cyclohexyl-2-benzothiazylsulfenamide).

As the extender oil for rubber used in the rubber composition of this invention, any one is selected from those used as processing oil usually for formulating rubber, depending on purposes and uses, and used. These extender oils for rubber are classified as paraffin series, naphthene series and aromatic series according to their structures, and the aromatic series ones are suitably used in applications in which the tensile strength and the wear resistance are regarded as important, while not only the naphthene series ones but also the paraffin series ones are suitably used in applications in which the impact resilience and the low-temperature characteristics are regarded as important. The amount of said extender oil for rubber is suitably 5 to 100 parts by weight per 100 parts by weight of the starting rubber. When it is less than 5 parts by weight, the processability is low and the dispersion of carbon black becomes insufficient, so that performance characteristics such as tensile strength and elongation are not exhibited, while when it exceeds 100 parts by weight, the tensile strength, impact resilience and the hardness are greatly lowered. Therefore, neither of such amounts are desirable. The amount is preferably 5 to 80 parts by weight.

Further, in the vulcanized rubber composition, aliphatic carboxylic acids represented by stearic acid are used as vulcanization assistants or processing aids preferably in an amount of 0.5 to 5 parts by weight per 100 parts by weight of the starting rubber component.

The rubber compositions of this invention can, if necessary, be further incorporated with fillers other than carbon black, zinc oxide, antioxidants, wax, etc. at the time of use.

The fillers other than carbon black include silicic acid, silicates, calcium carbonate, titanium oxide, various clays, etc.

The compositions of this invention are obtained by kneading the above-mentioned ingredients by means of a mixer well known as that for rubber industry, for example, an open roll mill, an internal mixer or the like by various well-known methods. Rubber articles obtained by subjecting these compositions to a vulcanization step have excellent performance characteristics as compared with rubber articles obtained from conventional rubber compositions, are suitable for treads of tire as described above, and are used particularly in cap treads, under treads, etc. of low-fuel-cost tires, all-season tires and high-performance tires. Needless to say, they can be used for purposes other than these purposes, for example, parts of tire such as sidewall, carcass and cushion rubber of tire, rubber vibration insulator, industrial articles by making the most of thir excellent performance characteristics.

The rubber-like polymer composition containing an amino compound which is one preferable embodiment of this invention is effectively prevented, as mentioned above, from increasing in Mooney viscosity even after storage for a long period of time, and the compound Mooney viscosity of a rubber composition formulated using said composition is restrained from increasing, resulting in improvement of the processability, as compared with a system containing no amino compound. Moreover, said rubber-like polymer composition is advantageous, for example, in that the performance characteristics of its vulcanized product are also excellent.

As described above, the rubber composition which is another aspect of this invention is obtained by using, as a constituent of the starting rubber, the polymer or the polymer incorporated with a specific amino compound which are obtained according to this invention, and it is useful as a rubber composition improved in various properties as that for treads of tire, etc.

EXAMPLES

This invention is concretely explained below with reference to several examples but is not limited thereto.

In the following examples and comparative examples, all parts are by weight unless otherwise specified. And "phm" denotes parts by weights per 100 parts of monomer.

Example 1

Two stainless-steel reactors with a capacity of 10 liters equipped with a jacket and a stirrer were connected in series, and continuous copolymerization was carried out using 1,3-butadiene and styrene (75/25 by weight) as monomers, n-hexane as solvent, n-butyl lithium as catalyst in a proportion (phm) of 0.06 g per 100 g of the monomers, 0.60 phm of ethylene glycol dibutyl ether as vinylating agent, and 1,2-butadiene as allene compound in an amount of 0.03 mole per mole of the catalyst. In the first reactor, the internal temperature was controlled so as to be 100° C., and the above-mentioned monomers and the like were fed by means of metering pumps so as to adjust the average residence time to 45 minutes.

The polymerization conversions at the outlet of the first reactor were measured by gas chromatography to find that the butadiene polymerization conversion was 97% and the styrene polymerization conversion 95%.

The Mooney viscosity was measured by means of a Mooney viscometer to be $ML_{1+4}^{100°\ C.}$ 42.

Further, the polymer solution was continuously introduced into the second reactor, and 0.19 phm (1 mole relative to Li) was continuously added in the second reactor, and the internal temperature was controlled so as to be 100° C.

At the outlet of the second reactor, 2,6-ditert-butyl-p-cresol was added as antioxidant, after which desolvation was carried out by stream stripping and drying was conducted by means of a heated roll at 110° C., whereby there was obtained a styrene-butadiene copolymer rubber having a functional group introduced into the end of polymer. This rubber is defined as evaluation sample A.

The Mooney viscosity of the rubber obtained was measured by means of a Mooney viscometer to be $ML_{1+4}^{100°\ C.}$ 43. The amount of bound styrene and the 1,2-vinyl content of butadiene portion were measured by means of an infrared spectrophotometer by the method of Hampton. The amount of the found styrene was 25% by weight, and the 1,2-vinyl content of butadiene portion was 29%. The molecular weight distribution ($\overline{Mw}/\overline{Mn}$) was measured to be 2.2 from results obtained by GPC, by using a calibration curve for polymer of standard polystyrenes. A curve of GPC showed that the molecular weight distribution was of one-peak type. The amount of isolated styrene was 64 wt. % based on the total styrene, as determined from GPC of ozone degradation product and that of long-chain block styrene was 0.6 wt.%.

Next, by use of evaluation sample A as starting rubber, compound were obtained using N 339 carbon black having (IA) of 90 mg/g and (DBP) of 119 ml/100 g, according to the formulation shown in Table 1 by means of a test Banbury mixer having a capacity of 1.7 liters by method B of the standard compounding and mixing procedure of ASTM-D-3403-75. These compounds were vulcanized and physical properties of each vulcanized compound were measured. The measurements were carried out by the following methods.

(1) Hardness and tensile strength:
Measured according to JIS-K-6301.

(2) Impact resilience:
Measured by according to the method of Luepke described as JIS-K-6301, except that the impact resilience at 70° C. was measured by heating of a sample in an oven at 70° C. for about 1 hour, taking out the sample quickly, and measuring its impact resilience.

(3) Goodrich heat generation:
A test was carried out by means of a Goodrich flexometer under the conditions of a load of 48 pounds, a displacement of 0.225 inch, a starting temperature of 50° C., and a rotation rate of 1800 rpm, and the difference between the raised temperature after 20 minutes and the starting temperature is shown.

(4) Wet skid resistance:
Measured according to the method of ASTm-E-808-74 by means of a portable skid tester of Stanley-London by using Safety Walk (mfd. by 3M) as road surface. The results are shown in terms of index, taking the measured value for SBR 1502 as 100.

The individual physical properties are tabulated in Table 3.

Examples 2 to 4 and 7 to 9, and Comparative Examples 1 to 4.

Production of rubbers for evaluation was conducted in the same manner as in Example 1, except that the formulations shown in Table 2 were employed. The rubbers obtained are defined as evaluation samples B to D and G to I, respectively. By use of evaluation samples B to D and G to I, compounds were obtained in the same manner as in Example 1, except that the formulations shown in Table 3 were employed. These compounds were vulcanized and physical properties of each vulcanized compound were measured. The physical properties measured are tabulated in Table 3.

Example 5

Two reactors with a capacity of 10 liters equipped with a stirrer and a jacket were connected in series, and 17.9 g/min. of purified 1,3 butadiene and 7.5 g/min. of purified styrene as monomers, 109.3 g/min. of n-hexane as solvent, n-butyl lithium as catayst in an amount of 0.065 phm relative to the total monomers, and tetramethylethylenediamine in an amount of 0.030 phm relative to the total monomers, were individually fed from the bottom of the first reactor by means of metering pumps. Further, 4.6 g/min. of purified 1,3 butadiene and 10.7 g/min. of n-hexane were fed from the position of ⅔ of the height of the first reactor, and polymerization was carried out while adjusting the stirring rotation rate to 250 rpm, the internal temperature to 105° C. and the average residence time to 45 minutes. The polymer was sampled at the outlet of the first reactor and its Mooney viscosity was measured to be $ML_{1+4}^{100°\ C.}$ 40. Further, the polymer solution was continuously introduced into the bottom of the second reactor, and 0.0065 phm (0.15 equivalent relative to Li) of silicon tetrachloride was continuously added from the bottom. In addition, a n-hexane solution of 0.16 phm (0.75 mole relative to Li) dicyclohexylcarbodiimide was added at the position of ⅔ of the height of the second reactor, and the resulting mixture was subjected to reaction. The temperature of the second reactor was controlled so as to be 100° C. To the polymer solution which had left the second reactor was continuously added 0.75 phm of BHT, and the solvent was removed by heating to recover a polymer.

The polymer obtained had a Mooney viscosity of $ML_{1+4}^{100°\ C.}$ 60 and a styrene content of 25% by weight, and the microstructure of its butadiene portion was as follows: 1,4-trans-linkage 46%, 1,4 cis linkage 32%, and 1,2-vinyl linkage 22%. Its $\overline{Mw}/\overline{Mn}$ was 2.2, and a curve of GPC indicated one-peak type. The amount of isolated styrene determined from GPC of ozone degradation product was 65% by weight based on the total styrene, and that of long-chain block styrene was 0.2% by weight. This polymer is defined as evaluation sample E.

This evaluation sample was made into a compound in the same manner as in Example 1, after which the compound was vulcanized and physical properties of the vulcanized compound were measured.

The evaluation physical properties of evaluation sample E are tabulated in Table 3.

Example 6

An experiment was carried out in the same manner as in Example 5, except that 0.15 phm of diphenylcyanamide (0.75 mole relative to Li) was used in place of dicyclohexycarbodiimide. The polymer thus obtained is defined as sample F. Its evaluated physical properties are similarly tabulated in Table 3.

TABLE 1

| Formulation No. | |
| --- | --- |
| Starting rubber*1 | 100 parts by weight |
| Aromatic oil | 10 parts by weight |
| Carbon black | 50 parts by weight |
| Stearic acid | 2 parts by weight |
| Zinc oxide | 3.5 parts by weight |
| Accelerator CZ*2 | 1.3 parts by weight |
| Sulfur | 2 parts by weight |

*1 Kyodo Oil X-140
*2 N-cyclohexyl-2-benzothiazylsulfenamide
Vulcanization conditions: 160° C.×20 min.

TABLE 2

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Composition of feed monomer butadiene/styrene weight ratio | 75/25 | 75/25 | 82/12 | 100/0 | 75/25 | 75/25 | 75/15 | 75/25 | 100/0 |
| n-BuLi feed phm | 0.060 | 0.060 | 0.050 | 0.050 | 0.065 | 0.065 | 0.060 | 0.060 | 0.050 |
| Vinylating agent | Ethylene glycol dibutyl ether | Ethylene glycol dibutyl ether | Tetramethylethylenediamine | Tetramethylethylenediamine | Tetramethylethylenediamine | Tetramethylethylenediamine | Potassium nonylphenoxide | Ethylene glycol dibutyl ether | Tetramethylethylenediamine |
| Using amount of vinylating agent phm | 0.60 | 0.60 | 0.15 | 0.25 | 0.03 | 0.03 | 0.24 | 0.60 | 0.25 |
| $ML_{1+4}^{100°C.}$ | 42 | 41 | 62 | 50 | 40 | 40 | 41 | 40 | 50 |
| Bound styrene % by weight | 25 | 25 | 12 | 0 | 25 | 25 | 25 | 25 | 0 |
| Vinyl in Butadiene % | 29 | 29 | 49 | 65 | 22 | 22 | 29 | 28 | 65 |
| Reactive compound | Dicyclohexyl carbodiimide | Diphenyl carbodiimide | Dicyclohexyl carbodiimide | Dicyclohexyl carbodiimide | Dicyclohexyl carbodiimide | Diphenylcyanamide | Dicyclohexyl carbodiimide | None | None |
| Feed phm | 0.19 | 0.18 | 0.16 | 0.16 | 0.16 | 0.15 | 0.19 | — | — |
| Polymer after reaction $ML_{1+4}^{100°C.}$ | 43 | 41 | 64 | 53 | 60 | 65 | 41 | 40 | 50 |
| $\overline{M}w/\overline{M}n$ | 2.2 | 2.1 | 2.1 | 2.0 | 2.2 | 2.3 | 2.3 | 2.1 | 2.1 |
| Ozone degradation-GPC isolated styrene % | 64 | 67 | 67 | — | 65 | 64 | 31 | 64 | — |
| Ozone degradation-GPC long-chain block styrene % | 0.6 | 0.8 | 0.5 | — | 0.2 | 0.3 | 4.6 | 0.7 | — |
| Evaluation sample | A | B | C | D | E | F | G | H | I |

TABLE 3

|  | Formulation No. | Example 1 | Example 2 | Example 3 | Example 4 | Example 5 | Example 6 |
|---|---|---|---|---|---|---|---|
| Starting rubber | Rubber of this invention parts | A 100 | B 100 | C 100 | D 100 | E 100 | F 100 |
|  | Natural rubber parts | — | — | — | — | — | — |
|  | SBR-1502 parts | — | — | — | — | — | — |
| Carbon (IA) mg/g |  | 90 | 90 | 90 | 90 | 90 | 90 |
| Carbon (DBP) ml/100 g |  | 119 | 119 | 119 | 119 | 119 | 119 |
| Vulcanization accelerator |  | N—Cyclohexyl 2-benzothiazyl-sulfenamide | Dibenzothiazyl disulfide | N—Cyclohexyl 2-benzothiazyl-sulfenamide | N—Cyclohexyl 2-benzothiazyl-sulfenamide | N—Cyclohexyl 2-benzothiazyl-sulfenamide | N—Cyclohexyl 2-benzothiazyl-sulfenamide |
| Compound $ML_{1+4}^{100°C.}$ |  | 58 | 57 | 91 | 88 | 63 | 70 |
| Hardness of vulcanized product HS (JISA) |  | 66 | 66 | 66 | 65 | 66 | 66 |
| 300% Modulus kgf/cm² |  | 165 | 167 | 160 | 125 | 170 | 165 |
| Tensile strength kgf/cm² |  | 250 | 248 | 220 | 175 | 255 | 235 |
| Elongation at break % |  | 410 | 420 | 430 | 380 | 410 | 400 |
| Luepke impact resilience room |  | 53 | 54 | 54 | 46 | 54 | 54 |

TABLE 3-continued

|  |  | Example 7 | Example 8 | Example 9 | Comparative Example 1 | Comparative Example 2 | Comparative Example 3 | Comparative Example 4 |
|---|---|---|---|---|---|---|---|---|
| temperature % |  |  |  |  |  |  |  |  |
| Luepke impact resilience 70° C. % |  | 70 | 70 | 71 | 66 | 72 | 70 |  |
| Goodrich heat generation 50° C. ΔT°C. |  | 25 | 25 | 25 | 28 | 24 | 24 |  |
| Wet skid resistance index |  | 100 | 100 | 100 | 103 | 98 | 98 |  |
| Starting rubber | Rubber of this invention parts | G 100 | A 50 | A 20 | H 100 | I 100 | H 50 | — |
|  | Natural rubber parts | — | 50 | 80 | — | — | 50 | — |
|  | SBR-1502 parts | — | — | — | — | — | — | 100 |
| Carbon (IA) mg/g |  | 90 | 90 | 90 | 90 | 90 | 90 | 90 |
| Carbon (DBP) ml/100 g |  | 119 | 119 | 119 | 119 | 119 | 119 | 119 |
| Vulcanization accelerator |  | N—Cyclohexyl 2-benzothiazyl- sulfenamide | N—Cyclohexyl 2-benzothiazyl- sulfenamide | N—Cyclohexyl 2-benzothiazyl- sulfenamide | N—Cyclohexyl 2-benzothiazyl sulfenamide | N—Cyclohexyl 2-benzothiazyl- sulfenamide | N—Cyclohexyl 2-benzothiazyl sulfenamide | N—Cyclohexyl 2-benzothiazyl sulfenamide |
| Compound $ML_{1+4}^{100°\ C.}$ |  | 59 | 45 | 39 | 57 | 88 | 50 | 53 |
| Hardness of vulcanized product HS (JISA) |  | 66 | 66 | 66 | 66 | 65 | 66 | 68 |
| 300% Modulus kgf/cm$^2$ |  | 165 | 170 | 165 | 140 | 115 | 165 | 160 |
| Tensile strength kgf/cm$^2$ |  | 240 | 255 | 270 | 210 | 150 | 230 | 250 |
| Elongation at break % |  | 420 | 450 | 455 | 410 | 370 | 440 | 450 |
| Luepke impact resilience room temperature % |  | 52 | 53 | 53 | 49 | 41 | 52 | 48 |
| Luepke impact resilience 70° C. % |  | 68 | 69 | 66 | 63 | 60 | 64 | 60 |
| Goodrich heat generation 50° C. ΔT°C. |  | 28 | 25 | 24 | 32 | 34 | 28 | 33 |
| Wet skid resistance index |  | 100 | 100 | 97 | 100 | 102 | 98 | 100 |

Comparative Examples 5 and 6

An experiment was carried out in the same manner as in Example 1, except that production of rubbers for evaluation was conducted according to the formulations shown in Table 4. Further, compounds were obtained in the same manner as in Example 1 and vulcanized, and physical properties of each vulcanized compound werre measured. The physical properties are tabulated in Table 4 together with those of the sample obtained by Example 1.

TABLE 4

|  | Example 1 | Comparative Example 1 | Comparative Example 5 | Comparative Example 6 |
|---|---|---|---|---|
| Strating rubber |  |  |  |  |
| Bound styrene % by weight | 25 | 25 | 25 | 25 |
| Vinyl % in butadiene | 29 | 28 | 29 | 28 |
| Reactive compound | Dicyclohexyl- carbodiimide | None | Tributyltin chloride | N,N,N',N'— tetramethylurea |
| Feed phm | 0.19 | — | 0.30 | 0.11 |
| Polymer after reaction $ML_{1+4}^{100°\ C.}$ | 43 | 40 | 42 | 48 |
| Mw/Mn | 2.2 | 2.1 | 2.2 | 2.3 |
| Ozone degradation GPC isolated styrene % | 64 | 64 | 64 | 46 |
| Ozone degradation-GPC Long-chain | 0.6 | 0.7 | 0.6 | 0.7 |

TABLE 4-continued

|  | Example 1 | Comparative Example 1 | Comparative Example 5 | Comparative Example 6 |
|---|---|---|---|---|
| block styrene % | | | | |
| Evaluation of compounds | | | | |
| Compound $ML_{1+4}^{100°\ C.}$ | 58 | 57 | 65 | 69 |
| Hardness of vulcanized product HS (JISA) | 66 | 66 | 66 | 66 |
| 300% Modulus kgf/cm² | 165 | 140 | 160 | 145 |
| Tensile strength kgf/cm² | 250 | 210 | 240 | 220 |
| Elongation at break % | 410 | 410 | 380 | 400 |
| Luepke impact resilience room temperature % | 53 | 49 | 51 | 52 |
| Luepke impact resistance 70° C. % | 70 | 63 | 67 | 67 |
| Goodrich heat generation 50° C. ΔT°C. | 25 | 32 | 28 | 30 |
| Wet skid resistance index | 100 | 100 | 100 | 100 |

From the results shown in Table 3, the following characteristics of the rubber compositions of this invention are apparent.

All of Examples 1 to 6 are compositions of this invention using as rubber component a polymer modified with a carbodiimide. Comparison between Examples 1 and 2 and Comparative Example 1 and comparison between Example 4 and Comparative Example 2 show that the compositions of this invention are greatly improved in all of tensile strength, impact resilience, and heat-generating properties as compared with the compositions using a polymer unmodified with a carbodiimide.

Example 7 is a composition of this invention using as rubber component a polymer modified at the end so as to have an amount of isolated styrene of as low as 31% as measured by ozone degradation-GPC, and is somewhat inferior to Example 1 but incomparably superior to Comparative Example 1 in performance characteristics.

Examples 8 and 9 are rubber compositions using a blend of the polymer of this invention and another rubber, are superior in tensile strenfth and impact resilience to Comparative Example 3, i.e., a rubber composition using as rubber component a polymer unmodified with a carbodiimide, and have low heat-generating properties.

Excellent effects of this invention are exhibited also in the other Examples.

From the results shown in Table 4, it can be seen that the polymer modified with a carbodiimide has lower compound Mooney viscosity, better processability, higher tensile strength and impact resilience at high temperatures which is related to fuel cost saving, and lower heat-generating properties, as compared with Comparative Examples 5 and 6 using other modifiers.

Examples 10 and 11, and Comparative Example 7

Into a reactor with a capacity of 10 liters equipped with a stirrer were charged 4598 g of cyclohexane, 780 g of purified 1,3-butadiene, 162 g of purified styrene and 38 g of tetrahydrofuran, and the temperature was maintained at 40° C., after which 0.52 g of n-butyl lithium was introduced thereinto to initiate polymerization, and thereafter the polymerization temperature was adiabatically raised. From the time when the internal temperature became 75° C., a mixture of 138 g of butadiene and 322 g of cyclohexane was added by means of a metering pump over a period of 15 minutes. The highest temperature in the reaction was 100° C. One minute after the completion of the addition, 0.132 g of tin tetrachloride (0.25 equivalent relative to Li) was added, and after another 1 minute, 1.26 g of dicyclohexylcarbodiimide (0.75 mole relative to Li) was added and the resulting mixture was subjected to reaction for 20 minutes. Then, 8 g of BHT was added as antioxidant to the polymer solution, after which the solvent was removed by heating to recover a polymer. The polymer obtained (sample J) had a Mooney viscosity ($ML_{1+4}^{100°\ C.}$) of 50, and a styrene content of 15% by weight, and the microstructure of its butadiene portion was as follows: 1,4 trans linkage 34%, cis-1,4 linkage 23%, and 1,2-vinyl linkage 43%. Its $\overline{M}w/\overline{M}n$ was 1.60 and a curve of GPC indicated two-peak type. The styrene content and the microstructure of the butadiene portion were determined by measurement of IR spectrum, followed by calculation by the method of Hampton. The $\overline{M}w/\overline{M}n$ was determined employing GPC (LC-5A mfd. by Shimazu Seisakusho, Ltd., columns: $10^4$, $10^5$ and $10^6$ one each, solvent: tetrahydrofuran, detector: differential refractometer), followed by calculation by a method using a calibration curve prepared using standard polystyrenes.

The amount of isolated styrene was 67% by weight based on the total styrene, as determined from GPC of ozone degradation product, and that of long-chain block styrene was 0.8% by weight.

The Mooney viscosity of polymer immediately before the addition of tin tetrachloride was 30 and its $\overline{M}w/\overline{M}n$ was 1.10. Further, sample K (Comparative Example 7) was obtained in the same manner as in the case of preparing sample J, except that no reaction with dicyclohexylcarbodiimide was carried out. The polymer obtained had a Mooney viscosity ($ML_{1+4}^{100°\ C.}$) of 53 and a styrene content of 15% by weight, and the microstructure of its butadiene portion was as follows: 1,4-trans linkage 34%, cis-1,4 linkage 23%, and 1,2-vinyl linkage 43%. Its $\overline{Mw}/\overline{Mn}$ was 1.65, and the amount of isolated styrene was 65%, while that of long-chain block styrene was 0.8% by weight. The Mooney viscosity of polymer immediately before adding tin tetrachloride was 30, and its $\overline{Mw}/\overline{Mn}$ was 1.10. The same compounds as in Example 1 were obtained for samples I and J under the compounding conditions shown in Table 1, and the vulcanized, and physical properties of each vulcanized compound were measured. In Example 11, a compound was obtained by use of sample J in the same manner as in Example 1, except for using N-550 carbon black having (IA) of 44 mg/g and (DBP) of 114 ml/100 g, and then vulcanized, and physical properties of the vulcanized compound were measured. The evaluation results are shown in Table 5.

Example 12

Into a reactor with a capacity of 10 liters equipped with a stirrer were charged 4920 g of cyclohexane, 918 g of purified 1,3-butadiene, 162 g of purified styrene and 38 g of tetrahydrofuran, and the temperature was maintained at 40° C., after which 0.52 g of n-butyl lithium was introduced thereinto to initiate polymerization, and thereafter the polymerizatoion temperature was adiabatically raised. The highest temperature in the reaction reached 110° C., and 10 minutes after the highest temperature had been reached, 0.132 g of tin tetrachloride (0.25 equivalent relative to Li) was added and after another 1 minute, 1.26 g of dicyclohexylcarbodiimide (0.75 mole relative to Li) was added, after which the resulting mixture was subjected to reaction for 20 minutes. Then, a polymer was recovered in the same manner as in Example 9. The polymer obtained (sample L) had a Mooney viscosity ($ML_{1+4}^{100° C.}$) of 48 and a styrene content of 15% by weight, and the microstructure of its butadiene portion was as follows: 1,4 trans linkage 35%, cis 1,4 linkage 23%, and 1,2-vinyl linkage 42%. Its $\overline{Mw}/\overline{Mn}$ was 1.60 and a curve of GPC was of two-peak type.

The amount of isolated styrene was 46% by weight based on the total styrene, as determined from GPC of ozone degradation product, and that of long-chain block styrene was 7.3% by weight.

The Mooney viscosity of polymer immediately before the addition of tin tetrachloride was 33 and its $\overline{Mw}/\overline{Mn}$ was 1.10. Further, a compound was obtained in the same manner as in Example 1 and then vulcanized, and physical properties of the vulcanized compound were measured.

The evaluation results are shown in Table 5.

Example 10 was incomparably superior to Comparative Example 7 in all of tensile strength, impact resilience and heat-generating properties.

Example 11 was a composition of this invention using N-550 carbon black, and though inferior in tensile strength to Example 10, it is very excellent in both impact resilience and heat generating properties.

Example 12 was a composition of this invention using as rubber component a polymer obtained by modifying at the end a polymer having an amount of long-chain block styrene of 7.3% as determined from GPC of ozone degradation product, and was somewhat inferior to Example 10 but incomparably superior to Comparative Example 7 in impact resilience and heat-generating properties.

As described above, effects of this invention are apparent.

TABLE 5

|  | Example | | Comparative Example | Example |
|---|---|---|---|---|
|  | 10 | 11 | 7 | 12 |
|  | | | Sample | |
|  | J | J | K | L |
| Compound Mooney viscosity | 80 | 77 | 81 | 83 |
| Hardness (JIS-A) | 64 | 64 | 65 | 65 |
| Tensile strength kgf/cm$^2$ | 230 | 190 | 215 | 225 |
| Luepke impact resilience room temperature % | 60 | 61 | 56 | 58 |
| Luepke impact resilience 70° C. % | 74 | 75 | 69 | 72 |
| Wet skid resistance (index) | 100 | 100 | 100 | 99 |
| Goodrich heat generation $\Delta T$ (° C.) | 25 | 24 | 29 | 27 |

Example 13 and Comparative Example 8

Preparation of polymers

Into a reactor with a capacity of 10 liters equipped with a stirrer and a jacket were charged 4200 g of cyclohexane, 640 g of purified butadiene, 160 g of purified styrene and 60 g of tetrahydrofuran as polar compound, and the temperature was maintained at 50° C., after which 0.34 g of n-butyl lithium was added as catalyst to initiate polymerization. Thereafter, the polymerization reaction was carried out for 60 minutes while maintaining the polymerization temperature at 40° to 85° C., and 0.104 g of tin tetrachloride (equivalent ratio to n-butyl lithium: 0.3) was first added to the resulting living polymer, followed by adding thereto 0.62 g of dicyclohexylcarbodiimide (equivalent ratio to n-bytyl lithium: 0.6), and branching reaction and addition reaction were carried out. Further, 8 g of di-tert-butylhydroxytoluene was added as antioxidant to this polymerization solution, after which the solvent was evaporated to recover a polymer.

The polymer obtained (sample M) had a Mooney viscosity ($ML_{1+4}$, 100° C.) of 68 and a styrene content of 20% by weight, and the microstructure of its butadiene portion was as follows: 1,4 trans linkage 26%, 1,4-cis linkage 19%, and 1,2-vinyl linkage 55%. According to analysis by GPC of this polymer, the amount of branched polymer molecule was 30%, the $\overline{Mw}/\overline{Mn}$ was 1.7, the amount of isolated styrene was 62% based on the total styrene, as determined from GPC of ozne degradation product, and the amount of long-chain block styrene was 0%. From analysis of the tin content of the polymer obtained and analysis of the reacting amount of dicyclohexylcarbodiimide, it was confirmed that a substantially objective reaction had been carried out.

The Mooney viscosity of the above-mentioned polymer before the branching reaction was 32 and its $\overline{Mw}/\overline{Mn}$ was 1.15 as measured by GPC.

Further, various polymers different in styrene content, microstructure of butadiene portion, branching agent, ratio of branched polymer molecule, etc. were prepared in the same manner as in the preparation of sample M. They were used as polymers within the scope of this invention and for comparison. Their polymer structures were shown in Table 6.

The styrene content and microstructure of butadiene portion were determined by measurement of spectra by means of an infrared spectrophotometer, followed by calculation by the method of Hampton. The $\overline{Mw}/\overline{Mn}$ was measured by a method using GPC (LC-3A mfd. by Shimazu Seisakusho, Ltd., columns: $10^4$, $10^5$ and $10^6$ one each, solvent: tetrahydrofuran, detector: a differential refractometer) and a calibration curve prepared using polystyrenes as standard substances.

Among the polymers listed in Table 6, samples M to S and sample W are polymers within the scope of this invention and samples T to V are polymers for comparison.

The rubbers listed in Table 7 were prepared as natural rubber and other rubber-like polymers and used for preparing rubber compounds.

Example 13 and Comparative Example 8

By use of the polymer listed in Table 6 and the other starting rubbers listed in Table 7, rubber compounds were obtained using the formulation for evaluation No. 1 shown in Table 8 and each starting rubber component having the composition shown in Table 9, by means of a test Banbury mixer having a capacity of 1.7 liters by method B of the standard compounding and mixing procedure of ASTMD-3403-75. These rubber compounds were vulcanized at 160° C. for 20 minutes, and physical properties of the vulcanized compounds and the processability were evaluated according to the following methods.

(1) Tensile strength: The same as in Example 1.
(2) Impact resilience: The same as in Example 1.
(3) Goodrich heat generation: The same as in Example 1.

TABLE 6

| | | Sample | | | | | | | | | | |
|---|---|---|---|---|---|---|---|---|---|---|---|---|
| | | M | N | O | P | Q | R | S | T | U | V | W |
| Mooney viscosity | | 68 | 57 | 71 | 75 | 60 | 58 | 83 | 65 | 65 | 68 | 55 |
| Styrene content (%) | | 20 | 7 | 15 | 25 | 0 | 25 | 0 | 20 | 20 | 15 | 35 |
| 1,2-Vinyl content (%) | | 55 | 72 | 33 | 38 | 78 | 13 | 13 | 55 | 54 | 33 | 20 |
| Branched polymer | Branching agent | $SnCl_4$ | $SnCl_4$ | $SnCl_4$ | $SiCl_4$ | $SnCl_4$ | $SnCl_4$ | DEA*[1] | $SnCl_4$ | — | $SnCl_4$ | $SnCl_4$ |
| | Amount (%) | 30 | 20 | 28 | 25 | 45 | 38 | 23 | 35 | 0 | 55 | 35 |
| Straight-chain polymer reacted with a carbodiimide | Kind of carbodiimide | Dicyclohexyl carbodiimide | Diphenyl carbodiimide | Dicyclohexyl carbodiimide | Dicyclohexyl carbodiimide | Dicyclohexyl carbodiimide | Diphenyl cyanamide | Dicyclohexyl carbodiimide | Dicyclohexyl carbodiimide | Dicyclohexyl carbodiimide | Dicyclohexyl carbodiimide | Dicyclohexyl carbodiimide |
| | Amount (%) | 55 | 75 | 63 | 50 | 42 | 55 | 70 | 0 | 60 | 0 | 40 |
| $\overline{Mw}/\overline{Mn}$ | | 1.7 | 1.6 | 1.5 | 1.6 | 1.9 | 1.6 | 1.5 | 1.7 | 1.15 | 1.8 | 1.7 |
| Isolated styrene determined from GPC of ozone degradation product (%) | | 62 | 53 | 65 | 58 | — | 70 | — | 62 | 65 | 64 | 58 |
| Long-chain styrene determined from GPC of ozone degradation product (%) | | 0 | 0 | 0 | 2 | — | 4 | — | 0 | 0 | 0 | 3 |

*[1]Diethyl adipate

TABLE 7

| | |
|---|---|
| Natural rubber: | No. 3 |
| Synthetic isoprene rubber: | Nipol IR2200 (mfd. by NIPPON ZEON) |
| High-cis BR: | JSR BR01 (mfd. by Japan Synthetic Rubber) |
| Emuslion polymer SBR: | JSR SBR1500 (mfd. by Japan Synthetic Rubber) |

TABLE 8

| Formulation No. 1 | |
|---|---|
| Starting rubber (Total) | 100 parts by weight |
| Aromatic oil*[1] | 12 parts by weight |
| N339 carbon*[2] | 48 parts by weight |
| Zinc white | 5 parts by weight |
| Stearic acid | 2 parts by weight |
| Aging resistor (N—isopropyl-N'—phenyl-P—phenylenediamine) | 1 parts by weight |
| Vulcanization accelerator NS*[3] | 1.4 parts by weight |
| Sulfur | 2.0 parts by weight |

*[1]Kyodo Oil Sonic X-140
*[2]Tokai Carbon Seast KH
*[3]T-butylbenzothiazylsulfenamide (4) Wet skid resistance: The same as in Example 1.
The results are shown in terms of indexes, taking the measured value for Comparative Example 8-5 as 100.

(5) Ice skid resistance: The same measuring apparatus as for wet skid resistance was used. Ice having surface temperature of −8° C. was used as road surface in a room adjusted to −8° C. The results are shown in terms of index, taking the measured value for Comparative Example 8-5 as 100.

(6) Roll processability: A 6-inch test roll was used and the handling properties and the wrap of each rubber compound on the roll were observed. A good result was expressed by 4 and bagging without any wrap on the roll by 1.

(7) Extrusion processability: A Garvey's die was attached to a Brabender Plastograph and the extrusion rate, the surface texture and the state of edge were observed. The best result was expressed by 4 and the worst result by 1.

TABLE 9

|  |  | Example 13-1 | Example 13-2 | Example 13-3 | Example 13-4 | Example 13-5 | Example 13-6 | Comparative Example 8-1 | Comparative Example 8-2 | Comparative Example 8-3 | Example 13-7 | Comparative Example 8-4 | Comparative Example 8-5 |
|---|---|---|---|---|---|---|---|---|---|---|---|---|---|
| Specific polymer of this invention | Sample | M | N | O | P | Q | R | — | — | — | W | — | — |
|  | Amount (parts by weight) | 60 | 60 | 60 | 60 | 60 | 60 | — | — | — | 60 | — | — |
| Polymer outside the scope of this invention | Sample | — | — | — | — | — | — | T | U | V | — | SBR1500 | SBR1500 |
|  | Amount (parts by weight) | — | — | — | — | — | — | 60 | 60 | 60 | — | 60 | 100 |
| Natural rubber or synthetic polyisoprene | Sample | RSS-3 | RSS-3 | RSS-3 | RSS-3 | RSS-3 | RSS-3 | RSS-3 | RSS-3 | RSS-3 | RSS-3 | RSS-3 | — |
|  | Amount (parts by weight) | 40 | 40 | 40 | 40 | 40 | 40 | 40 | 40 | 40 | 40 | 40 | — |
| Roll processability |  | 4 | 4 | 3 | 4 | 3 | 4 | 4 | 2 | 3 | 4 | 4 | 3 |
| Extrusion processability |  | 4 | 3 | 3 | 4 | 4 | 4 | 4 | 1 | 4 | 4 | 5 | 4 |
| Compound Mooney viscosity |  | 57 | 60 | 65 | 59 | 63 | 55 | 54 | 79 | 55 | 58 | 45 | 52 |
| Tensile strength (kgf/cm$^2$) |  | 282 | 262 | 271 | 285 | 257 | 288 | 275 | 277 | 265 | 284 | 272 | 263 |
| Impact resilience, 70° C. (%) |  | 70 | 70 | 72 | 70 | 71 | 70 | 65 | 70 | 66 | 70 | 59 | 58 |
| Goodrich heat generation ΔT (°C.) |  | 23 | 22 | 21 | 22 | 22 | 23 | 28 | 22 | 28 | 23 | 34 | 37 |
| Wet skid resistance (index) |  | 104 | 105 | 95 | 100 | 103 | 93 | 105 | 104 | 96 | 110 | 98 | 100 |
| Ice skid resistance (index) |  | 100 | 98 | 130 | 110 | 110 | 125 | 100 | 95 | 125 | 75 | 100 | 100 |

As is evident from the results on the processability and the physical properties of vulcanized product, the rubber compositions comprising a polybutadiene or a styrene-butadiene copolymer (samples M to R) having a specific structure defined in this invention and natural rubber are excellent not only in processability but also in tensile strength, impact resilience, low heat-generating properties, wet skid characteristics and ice skid characteristics. The rubber composition comprising a styrene-butadiene copolymer (sample W) of this invention and natural rubber is insufficient in ice skid characteristics but excellent in processability, tensile strength, impact resilience, low heat-generating properties and wet skid characteristics. Among the rubber compositions comprising each of samples T to V outside the scope of this invention and natural rubber, the compounds having good processability are insufficient in impact resilience and heat-generating properties, while the compound having good impact resilience and low heat-generating properties is insufficient in processability.

Example 14 and Comparative Example 9

The specific polymers according to this invention listed in Table 10 were made into rubber compositions according to the formulation shown in Table 8 as in Example 13, and their processability and physical properties of their vulcanized products were measured.

As is evident from the results shown in Table 10, the rubber compositions of Examples 14-1 to 14-13 using as starting rubber component a blend of the specific polymer of this invention and a natural rubber component and/or a synthetic rubber component in the ratio according to this invention, in particular, Examples 14-2 to 14-4 and Examples 14-7 to 14-12 are good in processability and in physical properties of vulcanized product. On the other hand, the rubber composition of Comparative Example 9 is insufficient in the balance between processability and physical properties of vulcanized product.

TABLE 10

|  | Example 14-1 | Example 14-2 | Example 14-3 | Example 14-4 | Example 14-5 | Example 14-6 | Example 14-7 | Example 14-8 | Example 14-9 | Example 14-10 | Example 14-11 | Example 14-12 | Example 14-13 | Comparative Example 9 |
|---|---|---|---|---|---|---|---|---|---|---|---|---|---|---|
| Sample M | 95 | 85 | 50 | 40 | 25 | 25 | — | — | — | — | 40 | 50 | — | — |
| Sample N | — | — | — | — | — | — | 50 | — | 30 | — | — | — | — | — |
| Sample Q | — | — | — | — | — | — | — | 60 | — | — | — | — | 25 | — |
| Sample R | — | — | — | — | — | — | — | — | 30 | 30 | — | — | — | — |
| Sample S | — | — | — | — | — | — | — | — | — | — | 10 | 20 | — | — |
| Natural rubber (RSS-3) | 5 | 15 | 30 | 50 | 75 | 25 | 35 | — | 40 | 50 | 50 | — | 40 | — |
| IR2200 (Polyisoprene) | — | — | 20 | — | — | — | 30 | — | — | — | 30 | — | — | — |
| SBR1500 Emulsion polymer | — | — | — | — | — | 50 | — | — | — | 20 | — | — | — | 100 |
| BR01 (Polybutadiene) | — | — | — | 10 | — | — | 15 | 10 | — | — | — | — | 35 | — |
| Roll processability | 2 | 3 | 5 | 4 | 5 | 4 | 4 | 4 | 4 | 4 | 3 | 3 | 4 | 3 |
| Extrusion processability | 1 | 3 | 4 | 4 | 4 | 4 | 3 | 5 | 4 | 5 | 4 | 3 | 4 | 4 |
| Compound Mooney viscosity | 91 | 70 | 55 | 51 | 45 | 53 | 61 | 48 | 57 | 51 | 57 | 62 | 55 | 52 |

TABLE 10-continued

| | Example 14-1 | Example 14-2 | Example 14-3 | Example 14-4 | Example 14-5 | Example 14-6 | Example 14-7 | Example 14-8 | Example 14-9 | Example 14-10 | Example 14-11 | Example 14-12 | Example 14-13 | Comparative Example 9 |
|---|---|---|---|---|---|---|---|---|---|---|---|---|---|---|
| Tensile strength (kgf/cm$^2$) | 233 | 249 | 273 | 258 | 287 | 277 | 266 | 245 | 268 | 275 | 260 | 251 | 245 | 263 |
| Impact resilience, 70° C. (%) | 72 | 70 | 71 | 73 | 67 | 61 | 71 | 72 | 72 | 70 | 74 | 74 | 66 | 58 |
| Goodrich heat generation ΔT (°C.) | 26 | 25 | 22 | 22 | 23 | 33 | 24 | 24 | 23 | 24 | 21 | 22 | 27 | 37 |
| Wet skid resistance (index) | 109 | 107 | 100 | 95 | 93 | 101 | 101 | 102 | 100 | 95 | 95 | 93 | 95 | 100 |
| Ice skid resistance (index) | 80 | 85 | 110 | 130 | 130 | 100 | 110 | 115 | 115 | 125 | 130 | 140 | 120 | 100 |

Example 15 and Comparative Example 10

An experiment was carried out in the same manner as in Example 10, and after dicyclohexylcarbodiimide was reacted, each of the amino compounds shown in Table 11 was added and the resulting mixture was stirred continuously for 10 minutes. Subsequently, 8 g of BHT was added as antioxidant to each polymer solution, after which the solvent was removed by heating to obtain a polymer composition. The polymer obtained had a Mooney viscosity [ML$_{1+4}$, 100° C.] of 50 and a sytrene content of 15% by weight, and the microstructure of its butadiene portion was as follows: 1,4 trans linkage 34%, cis 1,4 linkage 23%, and 1,2 vinyl likage 43%. The Mooney viscosity [ML$_{1+4}$, 100° C.] of polymer immediately before adding tin tetrachloride was 30 (Examples 15-1 and 15-2).

A polymer composition obtained by the same treatment as described above, except for adding no amino compound, is defined as Example 15-3. Polymer compositions obtained by adding 1.19 g (0.75 mole relative to Li) of diphenylcarbodiimide in place of dicyclohexylcarbodiimide, subjecting the resulting mixture to reaction for 20 minutes, adding the amino compound shown in Table 11, and stirring the resulting mixture continuously for 10 minutes, are defined as Examples 15-4 and 15-5, respectively.

A polymer composition obtained by the same treatment as described above, except for adding no amino compound, is defined as Example 15-6.

A polymer composition obtained by conducting polymerization, addition of tin tetrachloride, and modification at the end with diphenylcarbodiimide in the same manner as described above, adding 8 g of BHT as antioxidant, thereafter removing the solvent by heating, and mixing the thus obtained polymer with the amino compound shown in Table 11 by means of rolls, was defined as Example 15-7. Comparative Example 10 is a polymer obtained without modification at the end and addition of an amino compound.

EXAMPLE 16 and Comparative Example 11

Two stainless-steel reactors with a capacity of 10 liters equipped with a stirrer and a jacket were connected in series, and continuous polymerization was carried out by using 1,3-butadiene as monomer, n-hexane as solvent, n-butyl lithium as catalyst in a proportion (phm) of 0.050 g per 100 g of the monomer, 0.25 phm of tetramethylethylenediamine as vinylating agent, and 1,2-butadiene as allene compound in an amount of 0.03 mole per mole of the catalyst. In the first reactor, the internal temperature was controlled so as to be 100° C., and the above-mentioned monomer and the like were fed by means of metering pumps so as to adjust the average residence time to 45 minutes.

Further, the polymerization solution was continuously introduced into the second reactor, after which each of the carbodiimides shown in Table 11 (1 equivalent relative to Li) was continuously added to the living polymer in the second reactor, and the internal temperature was controlled so as to be 100° C. The amino compound shown in Table 11 was continuously added at the outlet of the second reactor, after which the resulting mixture was introduced into an in-line mixer, and BHT was added as antioxidant. Then, the solvent was removed by means of a drum dryer at 130° C. to obtain a polymer composition.

The microstructure of the polybutadiene was as follows: 1,4-trans linkage 33%, cis 1,4 linkage 12%, and 1,2-vinyl linkage 65%. The Mooney viscosity [ML$_{1+4}$, 100° C.] of the polymer composition immediately after preparation was 54 (Examples 16-1, 16-2 and 16-3).

A polymer obtained in the same manner as described above, except for adding no amino compound, was defined as Example 16-4, and a polymer obtained without modification at the end and addition of an amino compound was Comparative Example 11.

The Mooney viscosity [ML$_{1+4}$, 100° C.] immediately after preparation of Examples 15 and 16 and Comparative Examples 10 and 11 and their Mooney viscosities [ML$_{1+4}$, 100° C.] after 1 week, 3 weeks and 6 weeks were measured. The results obtained are shown in Table 11.

TABLE 11

| | Modifier for[1] living end | Amino compound Kind | Adding amount (2) | ML$_{1+4}$, 100° C. immediately after preparation | ML$_{1+4}$, 100° C. after 2 weeks | ML$_{1+4}$, 100° C. after 1 month | ML$_{1+4}$, 100° C. after 3 months |
|---|---|---|---|---|---|---|---|
| Example 15-1 | Dicyclohexyl carbodiimide | Tetraethylene-pentamine | 2 | 50 | 51 | 52 | 52 |
| Example 15-2 | Dicyclohexyl carbodiimide | Tetraethylene-pentamine | 10 | 50 | 51 | 51 | 52 |
| Example | Dicyclohexyl | — | — | 49 | 54 | 58 | 61 |

TABLE 11-continued

| | Modifier for[1] living end | Amino compound Kind | Adding amount (2) | $ML_{1+4}$, 100° C. immediately after preparation | $ML_{1+4}$, 100° C. after 2 weeks | $ML_{1+4}$, 100° C. after 1 month | $ML_{1+4}$, 100° C. after 3 months |
|---|---|---|---|---|---|---|---|
| 15-3 | carbodiimide | | | | | | |
| Example 15-4 | Diphenyl-carbodiimide | N,N'—Dioctyl-p-phenylenediamine | 2 | 51 | 52 | 53 | 53 |
| Example 15-5 | Diphenyl-carbodiimide | N,N'—Dioctyl-p-phenylenediamine | 10 | 51 | 51 | 52 | 52 |
| Example 15-6 | Diphenyl-carbodiimide | N,N'—Dioctyl-p-phenylenediamine | 2 | 52 | 53 | 54 | 56 |
| Example 15-7 | Diphenyl-carbodiimide | — | — | 53 | 55 | 59 | 65 |
| Comparative Example 10 | — | — | — | 50 | 50 | 50 | 50 |
| Example 16-1 | Dicyclohexyl-carbodiimide | Tetraethylene-pentamine | 2 | 54 | 55 | 57 | 58 |
| Example 16-2 | Diphenyl-cyanamide | Tetramethylene-pentamine | 10 | 54 | 55 | 56 | 56 |
| Example 16-3 | Diphenyl-cyanamide | Tetraethylene-pentamine | 10 | 54 | 55 | 55 | 56 |
| Example 16-4 | Dicyclohexyl-carbodiimide | — | — | 54 | 58 | 62 | 64 |
| Comparative Example 11 | — | — | — | 54 | 54 | 54 | 54 |

Note:
[1]A carbodiimide was reacted in an amount of 0.75 mole per mole of the lithium end of polymer.
[2]The number of moles of amino group per mole of the carbodiimide reacted is shown.

Further, compounds were obtained by use of each polymer composition after the lapse of 3 months according to the formulation shown in Table 1 in the same manner as in Example 1, and then vulcanized, and physical properties of each vulcanized compound were measured.

The wear resistance was measured by means of a pico abrasion tester and expressed in terms of index, taking the measured value for Comparative Example 10 or 11 as 100.

Carbon gel in compound polymers of Examples 15-1 and 15-3 and Comparative Example 10 after mixing sulfur were determined to be 35%, 25% and 20%, respectively. The determination of carbon gel was carried out according to the following method:

$$\text{Carbon gel} = \frac{W_G - W_O \cdot Ft}{W_O \cdot Fr} \times 100$$

Ft: the weight ratio of benzene-insoluble compounding ingredients.
Fr: the weight ratio of rubber component
$W_O$: the weight of compound polymer before test (about 0.1 g, divided in 10)
$W_G$: The weight after immersion in benzene for 24 hours, followed by taking out, and drying by means of a vacuum dryer at 70° C. for 24 hours.
Harris' basket used: made of 10-mesh brass.
Volume of benzene used: 100 cc The measurement results of physical properties of the compounds of Example 15 and Comparative Example 10 are shown in Table 12. Similarly, results for Example 16 and Comparative Example 11 are shown in Table 13.

The results shown in Tables 11, 12 and 13 show that the addition of an amino compound in this invention, as compared with the case of no addition thereof, leads to effective prevention of the increase of Mooney viscosity after storage for a long period of time, depression of the increase of compound Mooney viscosity after compounding, and excellent performance characteristics of physical properties of vulcanized product.

TABLE 12

| | Example | | | | | | | Comparative Example |
|---|---|---|---|---|---|---|---|---|
| | 15-1 | 15-2 | 15-3 | 15-4 | 15-5 | 15-6 | 15-7 | 10 |
| Compound Mooney viscosity | 85 | 83 | 99 | 84 | 83 | 89 | 103 | 78 |
| Impact resilience 70° C. (%) | 76 | 77 | 71 | 76 | 77 | 76 | 72 | 65 |
| Wet skid resistance (index) (1) | 100 | 100 | 100 | 100 | 100 | 100 | 100 | 100 |
| Goodrich heat generation ΔT (°C.) | 25 | 24 | 29 | 25 | 24 | 26 | 28 | 33 |
| Hardness (JIS-A) | 64 | 65 | 65 | 65 | 65 | 64 | 64 | 64 |
| Tensile strength (kgf/cm²) | 240 | 245 | 215 | 240 | 245 | 240 | 220 | 195 |
| Elongation at break | 440 | 400 | 400 | 430 | 410 | 430 | 410 | 400 |

TABLE 12-continued

|  | Example | | | | | | | Comparative Example |
|---|---|---|---|---|---|---|---|---|
|  | 15-1 | 15-2 | 15-3 | 15-4 | 15-5 | 15-6 | 15-7 | 10 |
| (%) Pico abrasion (index) | 117 | 122 | 103 | 114 | 122 | 111 | 102 | 100 |

Note:
(1) Expressed in terms of index, taking the measured value for Comparative Example 3 as 100.

TABLE 13

|  | Example | | | | Comparative Example |
|---|---|---|---|---|---|
|  | 16-1 | 16-2 | 16-3 | 16-4 | 11 |
| Compound Mooney viscosity | 83 | 86 | 86 | 99 | 78 |
| Impact resilience (%) | 86 | 68 | 69 | 63 | 56 |
| Wet skid resistance (index) (1) | 100 | 100 | 100 | 100 | 100 |
| Goodrich heat generation ΔT (°C.) | 25 | 25 | 24 | 30 | 37 |
| Tensile strength (kgf/cm$^2$) | 170 | 175 | 180 | 160 | 150 |
| Pico abrasion (index) | 120 | 122 | 125 | 106 | 100 |

Note:
(1) Expressed in terms of index, taking the measured value for Comparative Example 5 as 100.

INDUSTRIAL UTILIZABILITY

As compared with rubber articles obtained from conventional rubber compositions, the rubber compositions of this invention exhibit excellent performance characteristics, the increase in Mooney viscosity of their compounds are only slight, and they are very excellent in processability, exhibit especially good impact resilience, tensile strength and wet skid properties, and have low heat-generating properties. Therefore, they are suitably used for used aimed at by ordinary compositions of polybutadienes or styrene-butadiene copolymer rubbers.

What is claimed is:

1. A polymer having a Mooney viscosity of 20 to 150 obtained by carrying out modification at the end of the polymer by reacting at least one carbodiimide selected from the group consisting of dialkylcarbodiimides, alkylarylcarbodiimides, diarylcarbodiimides, dialkylcyanamides, alkylarylcyanamides and diarylcyanamides with a living polymer which is a rubber-like polybutadiene or a rubber-like butadiene-styrene copolymer having an amount of bound styrene at 45% by weight or less obtained by polymerization in a hydrocarbon solvent by use of an organolithium catalyst, and has a vinyl linkage content of a butadiene portion of 10 to 70%, and a molecular weight distribution ($\overline{Mw}/\overline{Mn}$) expressed in terms of the ratio of the weight average molecular weight ($\overline{Mw}$) to the number average molecular weight ($\overline{Mn}$) as measured by GPC of 1.2 to 3.

2. The polymer according to claim 1 comprising a branched polymer molecule and a straight-chain polymer molecule, obtained by bonding a trifunctional or higher-order coupling agent to living active sites of said living polymer in an amount of 0.1 to 0.7 equivalent per mole of the living active site, and introducing a carbodiimide into all the other living active sites, in which (1) 10 to 50% by weight of the molecules constituting the polymer is a branched polymer formed by bonding by said trifunctional or higher-order coupling agent, (2) at least 20% by weight of the molecules constituting the polymer is a straight-chain polymer having the carbodiimide added thereto, and (3) the styrene content of the polymer is 0 to 30% by weight.

3. A process for producing a rubber-like polybutadiene or a rubber-like butadiene-styrene copolymer having a Mooney viscosity of 20 to 150, which comprises reacting butadiene monomer or styrene and butadiene monomers in a hydrocarbon solvent in the presence of an organolithium catalyst to obtain a living polymer having a vinyl linkage content of a butadiene portion of 10 to 70%, a molecular weight distribution ($\overline{Mw}/\overline{Mn}$) expressed in terms of the ratio of the weight average molecular weight ($\overline{Mw}$) to the number average molecular weight ($\overline{Mn}$) as measured by GPC of 1.2 to 3, and an amount of bound styrene of 45% by weight or less in the case of a copolymer of styrene and butadiene, and reacting at least one carbodiimide selected from the group consisting of dialkylcarbodiimides, alklarylcarbodiimides, diarylcarbodiimides, dialkylcyanamides, alkylarylcyanamides and diarylcyanamides with said living polymer to carry out modification at the end of the polymer.

4. The process for producing a rubber-like polybutadiene or a rubber-like butadiene-styrene copolymer according to claim 3, which comprises reacting a trifunctional or higher-order coupling agent with living active sites of the living polymer in an amount of 0.1 to 0.7 equivalent per equivalent of the living active site before or simultaneously with reacting a carbodiimide, and thereby forming a branched polymer molecule in a portion of the molecule.

5. A rubber composition for tire treads, which comprises, a blend of 100 parts by weight of a starting rubber containing at least 10% by weight of a polymer with a Mooney viscosity of 20 to 150 obtained by carrying out modification at the end of the polymer by reacting at least one carbodiimide selected from the group consisting of dialkylcarbodiimides, alkylarylcarbodiimides, diarylcarbodiimides, dialkylcyanamides, alkylarylcyanamides and diarylcyanamides with a living polymer which is a rubber-like polybutadiene and/or a rubber-like butadiene-styrene copolymer having an amount of bound styrene of 45% by weight or less obtained by polymerization in a hydrocarbon solvent by use of an organolithium catalyst and has a vinyl linkage content of a butadiene portion of 10 to 70% and a molecular weight distribution ($\overline{Mw}/\overline{Mn}$) expressed in terms of the ratio of the weight average molecular weight ($\overline{Mw}$) to the number average molecular weight ($\overline{Mn}$) as measured by GPC of 1.2 to 3, 10 to 100 parts by weight of carbon black, 0.1 to 5 parts by weight of sulfur, and a vulcanization accelerator.

6. The polymer according to claim 1, wherein the organolithium catalyst is present in an amount of 0.3 to 3 mmoles.

7. The polymer according to claim 1, wherein the hydrocarbon solvent is present in an amount of 1 to 20 parts by weight per one part of a monomer.

8. The polymer according to claim 1, wherein the hydrocarbon solvent is selected from the group consisting of n-butane, n-pentane, iso-pentane, n-hexane, n-heptane, iso-octane, cyclohexane, methylcyclopentane, benzene and toluene.

9. The polymer according to claim 1, wherein the amount of the bound styrene is 5% to 45% by weight.

10. The polymer according to claim 1, wherein the carbodiimide is selected from the group consisting of dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, phenylbenzylcarbodiimide, dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenylcyanamide, and phenylbenzylcyanamide.

11. The polymer according to claim 1, wherein the carbodiimide is present in a proportion of 0.2 to 5 moles per mole of the living polymer.

12. The polymer according to claim 2, wherein the total amount of the branched polymer molecule and the straight-chain polymer molecule having the carbodiimide bonded thereto is 50% by weight or more of the molecules constituting the polymer.

13. The polymer according to claim 2, wherein the trifunctional or higher-order coupling agent includes polyhalogenated compounds, diesters, compounds having two or more diglycidylamine groups, polyepoxy compounds, polyisocyanates, polyimines, polyaldehydes, polyketones, and polyanhydrides.

14. The polymer according to claim 5, wherein the polybutadiene and/or the butadiene-styrene copolymer is present in an amount of 30 to 90 parts by weight of the starting rubber component.

15. The polymer according to claim 5, wherein the vulcanization accelerator is selected from the group consisting of compounds from the sulfenamide series, the thiazole series, the guanidine series and the thiuram series.

16. The polymer according to claim 5, wherein the vulcanization accelerator is present in an amount of 0.2 to 3 parts by weight per 100 parts by weight of the starting rubber.

17. The polymer according to claim 5, wherein the vulcanization accelerator is selected from the group consisting of the thiazole series having the following formula as its basic structure:

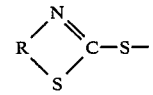

wherein R is an alkylene or an arylene group.

* * * * *